Sept. 30, 1969   T. R. SEAMAN   3,469,467
COMPOSITE DRIVE WHEEL
Filed Oct. 30, 1967

INVENTOR
THOMAS R. SEAMAN
BY Evan D. Roberts
ATTORNEY

United States Patent Office 3,469,467
Patented Sept. 30, 1969

3,469,467
COMPOSITE DRIVE WHEEL
Thomas R. Seaman, Baldock, England, assignor, by mesne assignments, to Borg-Warner Corporation, Chicago, Ill., a corporation of Delaware
Filed Oct. 30, 1967, Ser. No. 678,800
Int. Cl. F16h 55/12, 55/30
U.S. Cl. 74—243         1 Claim

ABSTRACT OF THE DISCLOSURE

A composite drive wheel device is disclosed herein to provide an illustration of this invention. This wheel provides a stamped circular plate having a complemental peripheral tooth root ribbon secured to said teeth with a plastic toothed rim which may be molded over the ribbon tooth roots.

Summary of the invention

This invention relates to a composite drive wheel device wherein a drive wheel plate is provided with a toothed periphery and a corrugated tooth root ribbon which is substantially complementary with respect to the plate teeth and is positioned on the peripheral plate teeth to provide tooth roots. A toothed plastic rim may be molded over the tooth roots with the teeth thereof in respective complemental relationship with the tooth roots.

Figure 1:
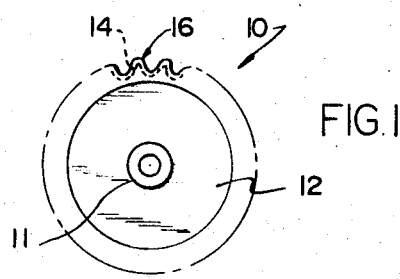
Figure 2:
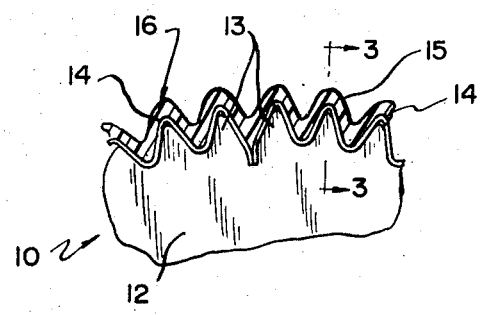
Figure 3:
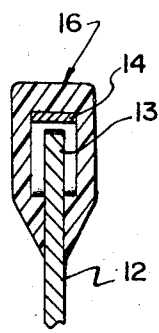

Other advantages and novel aspects of the invention will become apparent upon the following detailed description, in conjunction with the accompanying drawing wherein:

FIG. 1 is a general illustrative representation of the composite drive wheel device of this invention showing a stamped plate having peripheral teeth and a corrugated tooth ribbon secured thereto with the plastic toothed rim molded thereover;

FIG. 2 is a partial axial view of the composite drive wheel of this invention showing the details of the tooth periphery and complementary tooth root ribbon secured thereto within the plastic toothed rim; and FIG. 3 is a partial sectional view of the composite drive wheel of this invention taken along line 3—3 of FIG. 2 showing the axial position of the corrugated tooth ribbon with respect to the stamped wheel plate.

A composite drive wheel generally designated by the numeral 10 is shown for the purpose of illustrating and describing this invention. The wheel 10 thus shown includes generally, among other things, a hub 11, a stamped plate body 12, peripheral tooth roots 13, a tooth root ribbon 14 complementally secured to the plate teeth 13 and a plastic tooth rim 15 which may be molded over the ribbon 14. The hub 11 is secured to the stamped plate body 12, and is adapted with an aperture to drivingly receive a drive or driven shaft. The plastic toothed rim 15 is molded over the tooth roots formed by the ribbon 14, as well as over the teeth 13 of the plate 12. The rim 15 is also provided with teeth 16 which are respectively substantially complemental with respect to the teeth of the tooth root ribbon 14.

Another embodiment of this invention is provided by a composite sprocket having the tooth root ribbon 14 secured over the tooth roots 13 of the body 12 without the plastic rim 15. It should be noted that a sprocket of this type would be a composite structure with sufficient tooth engaging surface to provide an efficient sprocket.

It is to be understood that the invention is not to be limited to the specific constructions and arrangements shown and described, as it will be understood to those skilled in the art that certain minor changes may be made without departing from the principles of the invention.

What is claimed is:

1. A composite drive wheel device comprising a drive wheel plate having a toothed periphery, a corrugated tooth root ribbon complementally positioned on said peripheral plate teeth to provide tooth roots, and a plastic tooth rim positioned over said ribbon and said peripheral plate teeth with the teeth thereof respectively and complementally positioned over said tooth roots.

References Cited

UNITED STATES PATENTS

| | | | |
|---|---|---|---|
| 1,393,886 | 10/1921 | Doty | 74—443 XR |
| 2,720,119 | 10/1955 | Sherman | 74—460 |
| 3,199,364 | 8/1965 | Dew | 74—460 |
| 3,272,027 | 9/1966 | Wayman | 74—243 |

FOREIGN PATENTS 539,809  9/1941  Great Britain.

FRED C. MATTERN, Jr., Primary Examiner
J. A. WONG, Assistant Examiner

U.S. Cl. X.R.
74—439